(12) United States Patent
Cabral

(10) Patent No.: US 12,079,216 B2
(45) Date of Patent: Sep. 3, 2024

(54) SYSTEMS AND METHODS FOR QUERYING AND PERFORMING OPERATIONS ON DATA USING PREDICATE LOGIC EXTENDED TO INCLUDE QUOTATION

(71) Applicant: Structured Knowledge Applications, Inc., Silver Spring, MD (US)

(72) Inventor: John Cabral, Silver Spring, MD (US)

(73) Assignee: Structured Knowledge Applications, Inc., Silver Spring, MD (US)

( * ) Notice: Subject to any disclaimer, the term of this patent is extended or adjusted under 35 U.S.C. 154(b) by 931 days.

(21) Appl. No.: 17/025,587

(22) Filed: Sep. 18, 2020

(65) Prior Publication Data
US 2021/0089536 A1 Mar. 25, 2021

Related U.S. Application Data

(60) Provisional application No. 62/903,258, filed on Sep. 20, 2019.

(51) Int. Cl.
*G06F 16/245* (2019.01)
*G06F 16/2453* (2019.01)
(Continued)

(52) U.S. Cl.
CPC .. *G06F 16/24547* (2019.01); *G06F 16/24552* (2019.01); *G06F 16/24561* (2019.01);
(Continued)

(58) Field of Classification Search
CPC .... G06N 5/04; G06N 5/025; G06F 16/24547; G06F 16/24552; G06F 16/24561; G06F 21/6227
See application file for complete search history.

(56) References Cited

U.S. PATENT DOCUMENTS

| 10,666,708 | B1* | 5/2020 | Gavalas | ................. H04L 67/06 |
| 2015/0269221 | A1* | 9/2015 | Raz | ..................... G06F 16/2425 |
| | | | | 707/706 |
| 2017/0262500 | A1* | 9/2017 | Braun | .............. G06F 16/24532 |

OTHER PUBLICATIONS

Baxter et al., "Interactive Natural Language Explanations of Cyc Inferences," *International Symposium on Explanation-Aware Computing* (2005).

(Continued)

*Primary Examiner* — Li Wu Chang
(74) *Attorney, Agent, or Firm* — Arnold & Porter Kaye Scholer LLP; Ali R. Sharifahmadian; Mark A. Patrick

(57) ABSTRACT

Systems and methods for utilizing a single sequence of operations for querying data and processing operations on the data when that is stored in an extended form of predicate logic are described herein. The systems and methods described herein may support storing, querying, and performing operations on data stored in a form of predicate logic that is extended to include quoting. The inclusion of quoting enables predicate logic to store data about queries and rules, thereby allowing queries and operations on data about queries and rules. This extended form of data in combination with the infrastructure described herein allows for the creation of entire applications that are defined in the same data language as the data process by that application. This creates a unified infrastructure that enables user to query, analyze, and process both applications and the data processed by those applications via a common method.

18 Claims, 5 Drawing Sheets

(51) Int. Cl.
   *G06F 16/2455*   (2019.01)
   *G06F 21/62*     (2013.01)
   *G06N 5/025*     (2023.01)
   *G06N 5/04*      (2023.01)
(52) U.S. Cl.
   CPC ......... *G06F 21/6227* (2013.01); *G06N 5/025* (2013.01); *G06N 5/04* (2013.01)

(56) References Cited

OTHER PUBLICATIONS

International Search Report issued in PCT/US2020/051573 on Nov. 25, 2020.
Matuszek et al., "An Introduction to the Syntax and Content of Cyc.," AAAI Spring Symposium on Formalizing and Compiling Background Knowledge and Its Applications to Knowledge Representation and Question Answering, Stanford, CA (2006).
Panton et al., "Common Sense Reasoning—From Cyc to Intelligent Assistant," *Big Data Analytics in the Social and Ubiquitous Context: 5th International Workshop on Modeling Social Media*, (2006).

* cited by examiner

SYSTEMS AND METHODS FOR QUERYING AND PERFORMING OPERATIONS ON DATA USING PREDICATE LOGIC EXTENDED TO INCLUDE QUOTATION

RELATED APPLICATIONS

This application claims priority to U.S. Provisional Application No. 62/903,258, filed Sep. 20, 2019, entitled "Systems and Methods for Improved Database Intelligence," the contents of which is incorporated herein by reference in its entirety.

FIELD OF THE INVENTION

The present invention relates to storing, querying, and performing operations on data stored in a form of predicate logic extended to include quotation.

BACKGROUND OF THE INVENTION

In computational languages, there is a divide between queries and the languages in which data is stored. Specifically, queries are formed in one language and data is stored in another language. For example, the Extensible Markup Language (XML) is a data language that is distinct from XQuery (or XML Query)—the language used to query and process XML documents. This means that an XQuery expression is not a valid XML expression, and vice versa. For databases, there is an even broader divide. The Structured Query Language (SQL) defines instructions for manipulating databases, but there is no standard language or format for the data itself—only references to the tables and columns which organize the data are part of the language.

That limitation entails that these query languages are incapable of asking queries about queries written in that language. For example, the SQL language has not been designed to support formulating an SQL query that analyzes other SQL statements. For example, using the core features of the SQL language, there is no way to take a list of SQL statements and extract what tables and columns they were accessing or to identify which statements in the list are accessing a given table. A consequence of this divide is that queries themselves cannot be treated as data.

This disconnect may be compounded when a system combines query languages with other programming languages. For example, an application could be written in the Java programming language and interact with a database using SQL. The Java application would programmatically create and execute SQL queries. Within current query languages, there is no way to analyze other languages to see what queries are being constructed. In the above example, SQL has no capability to process Java code and to identify the SQL queries that are part of a program.

This technical problem has practical implications for security, privacy, and compliance practices and legal requirements. Protecting data requires understanding what is and what can happen within a system. However, protection goes beyond the basics of security which focuses on unauthorized changes to data. Privacy and other forms of compliance can include auditing systems to document the data which a system contains, what actions can be performed on it, and who can perform which actions.

As an example, the Privacy Act of 1974 established requirements for federal agencies regarding how personal information is collected, managed, and utilized. A central trigger for Privacy Act compliance (e.g., under 5 U.S.C. § 552) is how information is accessed. Specifically, if an individual's information is accessed via that person's name, an assigned identifier. or some other attribute(s) (e.g., a photograph), then that collection of information becomes a "system of records" and triggers a range of requirements. This definition entails that a given database constitutes a Privacy Act system of records not based on just the data it contains, but also on how that data is accessed. For organizations covered by the Privacy Act, a proper determination of compliance requires understanding both the content within a database and how applications access it. The practical implications of the technical problem described herein arises with the needed steps to complete a Privacy Act compliance evaluation.

Because current query languages are unable to treat queries as data, the various options to complete an evaluation required under the Privacy Act may rely on some combination of manual effort and trust. This reliance stems from the lack of a technical solution that would allow someone, who we will call an auditor, to query an application's code and how it interacts with the database to determine if its design triggers Privacy Act requirements.

The most direct form of evaluation is a manual review. For example, an auditor may manually review the code itself to reconstruct its behavior and interactions with the database. In theory, this would allow the auditor to fully understand the behavior of the system. However, there are numerous problems that prevent this from being an effective approach. First, a manual review is prone to error due to the complexity of the task. Second, a manual review is time and resource intensive. The time to complete the evaluation grows with the size of the system. Further, it requires the auditor to have similar skills and knowledge as the team that developed the system. Finally, there are a range of complications around the code itself, such as an organization being granted access to source code and the source code's understandability based on how clearly it was written and documented. There are development tools to help improve the efficiency of software engineers work with source code by providing search, debug, and profiling tools. These provide some help, but do not solve the problem that the evaluation depends on the auditor manually reviewing and understanding the code as it relates to legal, regulatory, or policy considerations, and then delivering an accurate evaluation.

Alternatively, the auditor could seek to indirectly evaluate a system via interviews and documentation reviews. With this approach, the auditor may interview the development team and review available documentation about its design and implementation to understand the information stored within the system and how it is utilized. Fundamentally, this approach relies on a degree of trust. The auditor must trust the interviews/interviewees and the documentation to deliver a complete and accurate description of the system. The trustworthiness of the team and the documentation is complicated by the many changes that systems and teams undergo. For example, the team members that built a given system may no longer be available when an evaluation is being performed, and new team members may not know or understand the system's full details. Further, as the system changes over time with updates, extensions, or fixes, the documentation may not reflect the current state of the system. Understanding these changes are essential to managing and protecting data within these systems and being able to evaluate systems' compliance with an organization's policies or laws and regulations covering the data they contain.

These various technical limitations and other drawbacks of conventional query languages leave organizations unable to have an automated and repeatable process for evaluating and auditing their systems. A technical solution is needed to address the inability of conventional query languages to run queries about queries and other operations.

SUMMARY OF THE INVENTION

Various embodiments of the present disclosure may include systems and methods configured to utilize a single sequence of operations for querying data and processing operations on the data. The systems and methods described herein may utilize a form of predicate logic extended to include quotation that enables ordinary data to be stored along with data about queries and rules, thereby allowing queries and operations on data about queries and rules. Predicate logic stores data in the form of individual sentences (declarative statements) and there is a broad range of terms which can be used to construct these sentences. The system configured to utilize this extended form of predicate logic may include, for example, a data server, an inference engine, a query server, an operation server, and/or one or more other components.

The data server may comprise a device configured to store data in the form of predicate logic sentences. It may use a variety of methods for organizing the stored data. The data server may be configured to support core operations for adding, removing, and modifying the statements that it stores. It may also support queries by enabling the matching of query formulas against stored sentences and support deductions by matching antecedent formulas against stored sentences.

The query server may comprise a device configured to process named queries (i.e., functional terms from which a fully-formed query can be deduced based on rules that connect terms in the functional term to positions in a templated query) given as inputs by external, authenticated entities. The query server performs a sequence of interactions with an inference engine, which is either internal to the query server device or accessible via a network connection. In various implementations, the sequence of interactions may include two steps. First, the query server uses the inference engine to determine if the external entity is authorized to run the named query based on the user, the functor of the named query, and/or its terms. If the named query passes the first step, the query server may run the named query using the inference engine and returns the results to the authenticated entity.

The operation server may comprise a device configured to process named operations (i.e., functional terms from which fully formed-statements to add or delete can be deduced based on rules that connect terms in the functional term to positions in the fully-formed statement) given as inputs by external, authenticated entities. The operation server may be configured to perform a sequence of interactions with an inference engine module, which is either internal to the operation server device or accessible via a network connection, and an associated data server, which is accessible via a network connection. In various implementations, the sequence of interactions may include four steps. First, the operation server uses the inference engine to determine if the external entity is authorized to perform the named operation based on the user, the functor of the named operation, and/or its terms. If the named operation passes the first step, then the operation server may use the inference engine to check that the named operation satisfies data integrity rules associated with the functor of the named operation. If the second step succeeds, the third step may then be to use the inference engine to deduce the sentences to add, remove, or delete from the data server. The final step may be to actually make the additions, deletions, or modifications to the data server.

The inference engine may comprise a device configured to perform inferences using the data server. The inference engine may have two specific behaviors: processing named queries and processing named operations. The inference engine may be configured to take the named query or operation and performs two steps. First, it may run an inference to determine the corresponding full query for the named query or operation. Second, it determines what rule statements, if any, should support the full query and how those rule statements fit together (i.e., how the consequents of one rule statement links the antecedent of another).

The process may begin with the query. Rule statements whose consequent formulas which can be linked to formulas in the query are connected first. Rule statements are recursively linked to other rule statements, where the formulas in the antecedents of earlier rule statements are linked to formulas in the consequents of later rules. The result is a tree like structure of connected rule statements, which we will call an "inference tree." The inference engine may be configured to processes the inference tree using the content of the data server. The process works from the rules that are at the leaves of inference tree (i.e., their antecedents are not connect to any other rule statements). In this situation, there are no deduced sentences which the inference engine is looking for. It may be configured to only use statements that are stored within the data server and then deduce new statements based on the terminal rule statements. At this point, there can be deduced statements and stored statements within the Data Server. Both sets of statements are now used for subsequent deductions performed with non-terminal rule statements. This process may recurse through the tree structure until results are being fed into the formulas within the query at the base of the inference tree. When this process finishes, a set of results are provided for the query.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The drawings are provided for purposes of illustration only and merely depict typical or example implementations. These drawings are provided to facilitate the reader's understanding and shall not be considered limiting of the breadth, scope, or applicability of the disclosure. For clarity and ease of illustration, these drawings are not necessarily drawn to scale.

DETAILED DESCRIPTION OF THE INVENTION

The invention described herein relates to systems and methods for utilizing a single sequence of operations for querying data and processing operations on the data when that data is stored in an extended form of predicate logic. The systems and methods described herein may support storage, queries, and operations on data stored in a form of predicate logic that is extended to include quoting. The inclusion of quoting enables predicate logic to store data about queries and rules, thereby allowing queries and operations on data about queries and rules. This extended form of data in combination with the infrastructure described herein allows for the creation of entire applications that are defined in the same data language as the data processed by that application. This creates a unified infrastructure that enables users to query, analyze, and process both applications and the data processed by those applications via a common method.

It will be appreciated by those having skill in the art that the implementations described herein may be practiced without these specific details or with an equivalent arrangement. In various instances, well-known structures and devices are shown in block diagram form to avoid unnecessarily obscuring the implementations.

Example System Architecture

Figure 1:
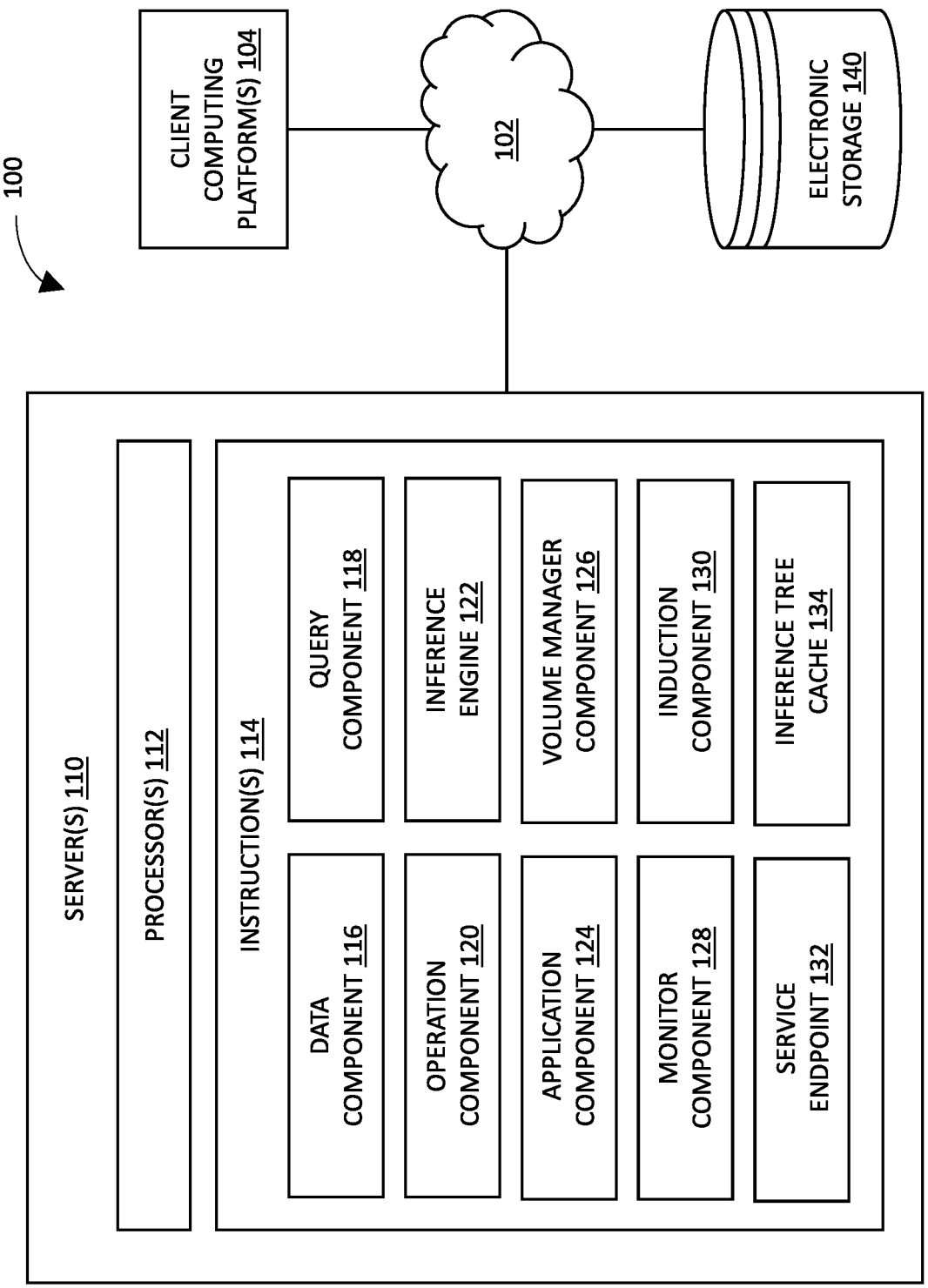
FIG. 1 illustrates a block diagram of an example of a system for processing queries and operations on data stored as sentences of predicate logic utilizing inference trees, according to an implementation of the invention.

FIG. 1 illustrates a block diagram of an example of a system 100 for processing queries and operations on data stored as sentences of predicate logic utilizing inference trees, according to an implementation of the invention. In various implementations, system 100 may include one or more client computing platforms 104, one or more servers 110, electronic storage 140, and/or other components. For example, system 100 may include one or more external resources, such as sources of information outside of system 100, external entities participating with system 100, and/or other resources.

In various implementations, one or more servers 110 (also interchangeably referred to herein as server(s) 110, server 110, or servers 110 for convenience) may be configured to communicate, receive input from, or otherwise interact with one or more client computing platforms 104 and/or other components of system 100. Users may access system 100 via client computing platform(s) 104. The server(s) 110 may provide the client computing platform(s) 104 with information necessary to present user interfaces on the client computing platform(s) 104. The client computing platform(s) 104 may communicate information back to server(s) 110 in order to facilitate further processing and/or functionality at server(s) 110. A given client computing platform 104 may include one or more processors configured to execute computer program components. By way of non-limiting example, a given client computing platform may include one or more of a desktop computer, a laptop computer, a handheld computer, a tablet computing platform, a NetBook, a Smartphone, and/or other computing platforms.

Communications may be facilitated through network(s) 102. The network(s) 102 may include wired and/or wireless connections. The network(s) 102 may include the Internet, Bluetooth, USB, and/or other communication networks. It will be appreciated that this is not intended to be limiting and that the scope of this disclosure includes implementations in which components of system 100 may be operatively linked via some other communication media.

In various implementations, server(s) 110 may include one or more physical processors 112 and/or other components. The one or more physical processors 112 (also interchangeably referred to herein as processor(s) 112, processor 112, or processors 112 for convenience) may be configured to provide information processing capabilities in system 100. As such, the processor(s) 112 may comprise one or more of a digital processor, an analog processor, a digital circuit designed to process information, a central processing unit, a graphics processing unit, a microcontroller, an analog circuit designed to process information, a state machine, and/or other mechanisms for electronically processing information.

In various implementations, processor(s) 112 may be configured to execute one or more computer readable instructions 114. Executing the computer readable instructions 114 may cause one or more processors 112 to utilize a single sequence of operations for querying and processing operations on data stored as sentences of predicate logic. Computer readable instructions 114 may include one or more computer program components. In some implementations, computer readable instructions 114 may be stored in electronic storage (e.g., electronic storage 140). Computer readable instructions 114 may include one or more of data component 116, query component 118, operation component 120, inference engine 122, application component 124, volume manager component 126, monitor component 128, induction component 130, and/or other computer program components. In some implementations, computer readable instructions 114 may further include and/or interact with one or more service endpoints 132, an inference tree cache 134, and/or one or more other components. As used herein, for convenience, the various computer readable instructions 114 will be described as performing an operation, when, in fact, the various instructions program the processor(s) 112 (and therefore system 100) to perform the operation. In some implementations, system 100 may further include one or more service endpoints 132

Data component 116 may be configured to store data associated with system 100 in the form of predicate logic sentences. In various implementations, data component 116 may be configured to utilize one or more methods for organizing the stored data. In various implementations, data component 116 may be configured to support core operations for adding, removing, and/or modifying the statements (or data) stored. In various implementations, data component 116 may be configured to enable the matching of query formulas against stored sentences. In various implementations, data component 116 may be configured to support deductions by matching antecedent formulas against stored sentences.

In various implementations, data component 116 may be configured to store data only in the form of atomic sentences (i.e., sentences without logical connectives or quantifiers). For example, data component 116 may be configured to store atomic sentences in an extended form of predicate logic described further herein. In various implementations, stored atomic sentences may comprise data, queries, inference trees, and/or descriptions of applications. In conjunction with inference engine 122 (i.e., via the operations described further herein with respect to inference engine 122), data component 116 may be configured to answer queries by matching formulas within a query against stored atomic sentences, as described further herein. In various implementations, data component 116 may comprise a data server that is separate and distinct from one or more of the other components of system 100.

Knowledge-based AI systems which rely on predicate logic typically store all logical content together. As such, in implementations in which system 100 comprises a knowledge-based AI system, data component 116 may be configured to store atomic sentences along with molecular statements (i.e., statements with logical connectives) or general statements (i.e., statements with quantifiers and variables). An example of an atomic sentence may be "(isTheFatherOf Adam Abel)". This atomic sentence could be read as "Adam is the father of Abel." An example of a molecular sentence using the "AND" logical connective may be "(isTheFatherOf Adam Abel) AND (isTheFatherOf Adam Cain)". This molecular sentence could be read as "Adam is the father of Abel and Cain." An example of a general statement with a universally quantified variable X and an existentially quantified variable Y may be "(For all X)(There Exists Y)(isTheFatherOf Y X)". This general statement could be read as "Everyone has a father." Storing atomic sentences along with molecular statements or general statements may be based on the standard way that deductions are performed in predicate logic, where all statements (atomic, molecular, or general) are together in a single set, and then processed through deductive operations. The inclusion of quotation and quote quantification may enable sentences to be made about queries and rule statements. In particular, data component 116 may be configured to store statements that connect the functors of named queries or named operations, and inference engine 122 (described herein) may be configured to run queries against these statements to retrieve their associated queries and rule statements. Accordingly, there may be no need to store rule statements separately.

Query component 118 may be configured to receive and process named queries. For example, query component 118 may be configured to process named queries (described below) given as inputs by external, authenticated entities. In various implementations, query component 118 may be configured to perform a sequence of interactions with inference engine 122, which may be a component of query component 118 and/or accessible by query component 118 via a network (e.g., network 102). In various implementations, query component 118 may be configured to utilize inference engine 122 to determine if an external entity is authorized to run a given query. If it is determined that the entity is authorized, query component 118 may be configured to run the named query using inference engine 122 and return the results to the authenticated entity. In various implementations, query component 118 may be configured to perform one or more of the operations of process 200 described herein with respect to FIG. 2. In some implementations, query component 118 may be configured to execute process 200 in response to receipt of a named query. In various implementations, query component 118 may comprise a query server that is separate and distinct from one or more of the other components of system 100.

Operation component 120 may be configured to receive and process named operations. For example, operation component 120 may be configured to process named operations (described below) given as inputs by external, authenticated entities. In various implementations, operation component 120 may be configured to perform a sequence of interactions with inference engine 122, which may be a component of operation component 120 and/or accessible by operation component 120 via a network (e.g., network 102). In various implementations, operation component 120 may be configured to utilize inference engine 122 to determine if an external entity is authorized to perform a given operation, based on the user, the functor of the named operations, and/or its terms. If it is determined that the entity is authorized, operation component 120 may be configured to use inference engine 122 to check that the operation satisfies data integrity rules associated with the functor and arguments of the named operation. If it is determined that the operation satisfies data integrity rules associated with the functor of the named operation, operation component 120 may be configured to use inference engine 122 to deduce the sentences to add, remove, or delete from the data stored by data component 116. Based on the sentences deduced, operation component 120 may be configured to perform the operations necessary to add, remove, or delete the data stored by data component 116. In various implementations, operation component 120 may be configured to perform one or more of the operations of process 300 described herein with respect to FIG. 3. In some implementations, operation component 120 may be configured to execute process 300 in response to receipt of a named operation. In various implementations, operation component 118 may comprise an operation server that is separate and distinct from one or more of the other components of system 100.

Inference engine 122 may be configured to perform inferences based on or using data associated with system 100. For example, inference engine 122 may be configured to perform inferences based on data stored by data component 116. In various implementations, inference engine 122 may be configured to both process "named queries" and process "named operations" in conjunction with query component 118 and operation component 120, respectively. A "named query" is a functional term whose functor is associated with a quoted query via data and quoted rule statements stored via data component 122. The contents of a named query functional term are parameters that may be used to configure the quoted query. A "named operation" is very similar to a named query, but the encoding results in a query whose results specify sentences and whether those sentences should be added, modified, or deleted within the Data Server.

The role of named queries and named operations can be understood in analogy to elements for common methods for implementing web services. Two recent approaches to web services are SOAP (Simple Object Access Protocol) and REST (Representational State Transfer). In a typical SOAP implementation, a web service is located at a network address and it has a fixed range of methods which it supports. XML messages are sent to the web service, indicating which method the message wants to activate and the XML message which will be the input to the method. The SOAP message processes the message and then returns another XML message. With RESTful web services, embedded messages can also be sent, but it also allows for the URL used to call the web service to include embedded input parameters for the called method (in that way, a message does not need to be sent in order to call the web service) and it also takes advantage of the semantics of the method used for communication using Hypertext Transfer Protocol (HTTP).

Unlike conventional web service technologies, system 100 is not limited to specific methods such that different instances would need to be called for different types of queries or operations. Rather, query component 118 and operation component 120 may receive any named query or named operation, and it is the connection of the named query or named operation received to the data stored by data component 116 that determines what queries will be run or operations will be performed. If a user elects to run another query or make a different set of changes, the user can use the same query component 118 and operation component 120— the user only need send in a different named query or operation.

In various implementations, inference engine 122 may be configured to function differently than other knowledge-based systems which utilize predicate logic. Traditionally, those systems would receive a query, look at all available data and rule statements, and then assemble a deduction during the processing of the query. This means that the way that an inference is completed is dependent on the specific rules that are available when the query is asked. These systems can grow in capability as new knowledge is added to the system in the form of rule statements because they enable new inferences to be completed. However, in the context of the technical problems described herein, this means that, as rule statements are added or removed from these other systems, the inferences which the system performs could change because there is no specified connection between the query and rules. By storing queries and rules in statements, linking specific functors to the queries and rules, and performing processing with named queries or operations, the specification of a link between queries and a fixed set of rules can be achieved. There may be a standard process where the quoted queries and rules are extracted and then assembled. The result is called an "inference tree." The process for constructing an inference tree is described further herein. In some implementations, inference engine 122 may be configured store constructed inference trees for later retrieval as described herein without the need to recreate the inference tree. For example, inference engine 122 may be configured to store constructed inference trees for later retrieval in inference tree cache 134.

In various implementations, inference engine 122 may be configured to receive a named query or named operation from query component 118 or operation component 120, respectively. In various implementations, inference engine 122 may be configured to run an inference to determine the corresponding full query for the named query or named operation. Using the common infrastructure, the full query is determined by inference engine 122, which applies a standardized query that directly asks what the full query is for the named query. However, the answer depends on rules associated with the functor of the named query. The inference engine runs a standardized query to identify the associated rules for the named query functor, then constructs and executes an inference tree based. In various implementations, inference engine 122 may be configured to then determine what rule statements, if any, support the full query based at least on how those rule statements fit together (i.e., how the consequents of one rule statement links the antecedent of another). In various implementations, inference engine 122 may be configured to execute a uniform method for processing both named queries and named operations. For example, inference engine 122 may be configured to perform the operations of process 400 described herein with respect to FIG. 4 for each named query or named operation inference engine 122 receives.

In various implementations, this uniform method may begin with a query. Rule statements whose consequent formulas which can be linked to formulas in the query are connected first. Rule statements are recursively linked to other rule statements, where the formulas in the antecedents of earlier rule statements are linked to formulas in the consequents of later rules. The result is the inference tree— the tree-like structure of connected rule statements. The set of rules used to assemble the inference tree are determined by a standard query based on the functor of the named query. A shortened form of this step could be performed if there is a cache of previously constructed inference trees that could be adapted to the current named query or operation.

In various implementations, inference engine 122 may be configured to assemble the inference tree based on matching two formulas. At the beginning, this may comprise matching a formula in the query against the consequent formula (i.e., the formula in the THEN part of an IF-THEN rule). In subsequence iterations, the matching may be between a formula of an antecedent formula (i.e., a formula in the IF part of an IF-THEN rule). The rule may be added into the inference tree and linked to the formula in cases when two formulas can be aligned. If the formulas cannot be aligned, the rule may be left out of the tree for that formula. In this discussion, the formula in the query or in the antecedent of the rule is the "source" formula, and the formula in the consequence of the rule is the "target" formula.

Before an alignment process begins, the variables in the original query and the candidate rules may be obfuscated. They may be given new names such that the sets of variables in the query and all of the rules are unique. In this way, the alignment process does not get conflate variables that happen to appears in both the source formula and the target rule.

Alignment is a process for testing various ways to fit two formulas together. Simple tests for alignment failure include determining whether the formulas have different numbers of arguments or whether there are different constants in the same position. If the rule passes those tests, inference engine 122 may be configured to look for ways to fit the rules together. Considering the different types of terms in the source formula that need to be compared against a term in the target formula, the following cases may be found: a bound-term against a variable; a variable against a bound term; a variable against a variable; a variable against an open compound term; an open compound term against a variable; and an open compound term against an open compound term. A "compound term" is a term made up of other terms, such as a functional term or quote term. An "open compound" term is a compound term that contains open variables. A compound term that contains no open variables is considered a "bound term."

The handling of each of these cases may involve two potential steps. First, inference engine 122 may be configured to modify the target formula (and the rule which contains it) to bring over bound terms or variables from the source formula into the target rule. For example, a source bound term may matched against a target variable. Inference engine 122 may then be configured to modify the target rule to replace all occurrences of the target variable with the source bound term. Alternatively, "converters" may be added to line up the terms in two matching positions. For example, if a source variable is matched against a target bound term, a converter may be introduced indicating that the source variable will always be bound to the target bound term. Different alteration and conversion strategies may be deployed for each case.

As the alignment process proceeds, it may be possible that the needed alignment steps will reach an inconsistent state. For example, two converters might be required for the same source variable appearing in different positions, but the two converters are using different target bound terms. In these cases, the alignment process fails because a variable could not be bound to two different terms, and the rule is excluded from the inference tree.

If the alignment process succeeds, the process may iterate for new rules that could be added as branches onto the formulas in the antecedent of the rule that was just completed. It would be a depth first approach, adding branches on to branches before returning to the formulas in the original query.

When constructed, the inference tree will have a tree structure with the query at the root. Each formula within the query has connected to it zero or more rules. These rules would include any changes that were made during the alignment process. Each connection between a formula and a specific rule would also have a set of any converters that were added during the alignment process.

As a simple example, consider a one formula query and a simple rule: the query is "Who are Bob's parents?" It could be expressed as a single (source) formula:

hasParent Bob?PARENT

Then consider a simple target rule: If someone is your father, then they are your parent.

hasParent?CHILD?FATHER, IF hasFather?CHILD?FATHER.

After obfuscating the variables, the source formula would be:

hasParent Bob?VAR1 and the target rule would be:

hasParent?VAR2?VAR3, IF hasFather?VAR2?VAR3.

After the alignment process completed, the updated target rule would be:

hasParent Bob?VAR1, IF hasFather Bob?VAR1.

In this example, there would be no need for converters, but the bound term in the first position of the source formula has replaced its matching variable in the target rule. Additionally, the variable in the second position of the source formula has replaced its matching variable in the target rule.

In some implementations, inference trees may be serialized using a variety of formats that support hierarchical or tree structures. In particular, a query may act as the root of the hierarchy. Each query formula would then be connected to the rules that had been aligned to it, along with a serialized form of any converters that were created during alignment. The rule's antecedent formulas would follow a similar structure, where they would be connected to the rules that they had been aligned to, along with serialized forms of any converts that were created during their alignment. This process may repeat for each formula in the query and each rule that was aligned to another rule.

In various implementations, inference engine 122 may be configured to process an inference tree using the stored data of the system (e.g., the content of the data server or the data stored by data component 116). In various implementations, inference engine 122 may be configured to process the inference tree using the stored data of the system, which is stored as sentences of predicate logic as described below. In various implementations, the process works from the rules that are at the leaves of the inference tree (i.e., their antecedents are not connected to any other rule statements). These rules (or rule statements) that are at the leaves of the inference tree may be referred to as "terminal rule statements." For the terminal rule statements, there are no deduced sentences which inference engine 122 is looking for. Thus, inference engine 122 may only use stored statements and then deduce new statements based on the terminal rule statements. At this point, there can be deduced statements and stored statements within the stored data. Both sets of statements are now used for subsequent deductions performed with non-terminal rule statements (i.e., intermediary rule statements). This process may recurse through the tree structure until results are being fed into the formulas within the query at the base of the inference tree. When this process finishes, a set of results are provided for the query.

There may be a third way that statements become available for deduction. In some implementations, inference engine 122 may include modules that allow it to compute certain statements to enable a deduction without the statements being deduced or stored. For example, if a rule statement relies upon a mathematical calculation from data in other statements, that calculation could be expressed as a formula within a rule statement. In some implementations, inference engine 122 may be configured to perform the calculation to determine the binding for the relevant variables, rather than storing every possible mathematical calculation or trying to deduce the calculation. In various implementations, inference engine 122 may include a wide range of modules for addressing these situations within its data.

Application component 124 may be configured to execute an application based on the predicate logic language described herein and using the inference engine to process both queries and operations required to instantiate a page of the application or to complete operations based on user inputs. In various implementations, the functionality of application component 124 may be divided between an application server, an application browser, and/or one or more other components. Accordingly, one or more of the operations described herein as being performed by the application server or the application browser may be performed by application component 124. In various implementations, application component 124 may be configured to perform one or more of the operations of process 500 described herein with respect to FIG. 5.

In various implementations, system 100 may include an application browser associated with an application server. In various implementations, the application browser may be configured to provide user with an interface to the application server (and, by extension, the query server and operation server). In various implementations, the application browser may be configured to render pages (specifying content that is the result of running queries associated with a name pages) on a display. For example, the application browser may be configured to render pages on a display of a client computing platform 104 of a user. In various implementations, the application browser may be configured to render pages with components which display the data returned by a named page. A named page is a functional term that denotes a single screen within the user interface of an application. A named page may be associated with multiple queries that identify the elements to appear on the screen, named queries for the data used to populate those elements, and named operations for interactions which the user can perform (e.g., button pushes). In various implementations, the components can translate human interactions with the application browser (via the page rendered on a display) into named operations or requests for named pages.

In various implementations, system 100 may include an application server associated with a query server (or query component 118) and an operation server (or operation component 120). In various implementations, the application server may be configured to respond to named page requests and named operations from application browser. In various implementations, the application server may be configured to interact with a query server (or query component 118) to process any named queries to get the content that makes up the page denoted by a named page. In various implementations, the application server may be configured to interact with an operation server (or operation component 120) to process any named operations initiated by the application browser. In various implementations, the application server may be configured to return page results to the application browser.

Volume manager component 126 may be configured to identify the location of stored data. In some implementations, system 100 may include volume manager component 126 to support scaling of the system. In some implementations, volume manager component 126 may be configured to keep track of the location of data storage (e.g., different data servers) and the collections of statements stores. In various implementations, operation component 120, inference engine 122, and/or one or more other components may utilize volume manager component 126 to locate relevant stored data that is needed to run a query or perform an operation, including operations on the data itself.

Monitor component 128 may be configured to run named queries to check on the state of data at specific points in time or in response to triggering events. In various implementations, monitor component 128 may comprise optional modules that utilize query component 118 (or components thereof). In various implementations, monitor component 128 may be configured to obtain the results of a query and perform the actions which correspond to the query results. These actions may occur within the system (e.g., performing a named operation) or outside the system (e.g., sending an email notification with the results of the query).

Induction component 130 may be configured to perform inductions to generate new rules. Induction is the process of creating rule statements from particular data (e.g., from data about a limited number of customers, create new rules about an entire category of customers). Induction component 130 may comprise one or more servers or modules that utilize query component 118 and/or operation component 120 (or components thereof). In various implementation, induction component 130 may be configured to utilize query component 117 to access data that may be the basis of the induction. In some implementations, induction component 130 may be configured to evaluate the accuracy of newly generated rules. In some implementations, induction component 130 may be configured to store data related to generated rules and their evaluations.

Service endpoint(s) 132 may comprise modules configured to translate inputs received. For example, one or more service endpoints 132 may comprise optional modules associated with query component 118 and/or operation component 120. The one or more service endpoints 132 may be configured to enable server(s) 110 to interact with other systems that use alternative messaging protocols. For example, one or more service endpoints 132 may be configured as SOAP or RESTful web services such that external systems have a traditional way to interact with the data stored within system 100 (e.g., data stored as sentences of predicate logic). In some implementations, one or more service endpoints 132 may be configured to translate inputs into named queries capable of being run using query component 118 and inference engine 122. In some implementations, one or more service endpoints 132 may be configured to translate inputs into named operations capable of being processed using operation component 120 and inference engine 122. In some implementations, at least one service endpoint 132 may be required to support authentication and present the named query or named operation as if it were sent by an authenticated user accessing the at least one service endpoint 132.

Inference tree cache 134 may be configured to store inference trees for later retrieval without requiring the recreation of the inference tree. In various implementations, inference engine 122 may be configured store constructed inference trees for later retrieval as described herein. For example, inference tree cache 134 may be configured to store serialized versions of inference trees that had been previously assembled by inference engine 122. In various implementations, serialized inference tree stored in inference tree cache 134 may be stored in relation to the functor of the associated named query. In various implementations, serialized inference trees may be parameterized such that values from a named query can be substituted into the serialized tree when it is deserialized by inference engine 122. Serialization is used to save the steps of constructing an inference tree. This efficiency can be improved if the serialization was not just for a single query, but for the range of queries that can be defined by a named query. Based on the rules that connect the named query to the full query, it is possible to identify the terms in the full query that come from the named query, as well as their subsequent appearance in rules within the inference tree after alignment. Those specific terms could be parameterized such that when the serialized tree is reconstituted, the process can reference the specific terms in the current named query and replace the parameters with the specific terms to give a fully specified inference tree for the named query.

Electronic storage 140 may comprise non-transitory storage media that electronically stores information. The electronic storage media of electronic storage 140 may be provided integrally (i.e., substantially non-removable) with one or more components of system 100 and/or removable storage that is connectable to one or more components of system 100 via, for example, a port (e.g., a USB port, a Firewire port, etc.) or a drive (e.g., a disk drive, etc.). Electronic storage 140 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 140 may include one or more virtual storage resources (e.g., cloud storage, a virtual private network, and/or other virtual storage resources). Although electronic storage 140 is shown in FIG. 1 as a single entity, this is for illustrative purposes only. In some implementations, electronic storage 140 may comprise multiple storage units. These storage units may be physically located within the same device, or electronic storage 140 may represent storage functionality of multiple devices operating in coordination.

Electronic storage 140 may store software algorithms, information determined by processor(s) 112, information received from server(s) 110, information received from one or more client computing platforms 104, information received from one or more external resources, and/or other information that enables server(s) 110 to function as described herein. In some implementations, data component 116 may be configured to store data associated with system 100 in electronic storage 140. In some implementations, volume manager component 126 may be configured to interface with electronic storage 140 to track the location of data stored within system 100. In some implementations, electronic storage 140 may be configured to store inference trees in inference tree cache 134.

Example Predicate Logic Language

Predicate logic stores information in declarative sentences, sentences that can be true or false. There are many varieties of predicate logic. The common feature which distinguishes them from propositional logic is that predicate logic allows for a description of the internal structure of sentences. Below is a Backus-Naur syntax for a simple predicate logic language which is very similar to the language of PROLOG, but which includes functional terms.

character::='a'-'z'|'A'-'Z'|'0'-'9'
constant::=character|character constant;
functional_term::='[' term_sequence ']';
term::=constant|functional_term;
term_sequence::=term|name term_sequence;
variable::='?' constant;
open_term::=term|variable|open_functional_term;
open_term sequence::=open_term|open_term open_term sequence;
open_functional_term::='[' open_term sequence ']';
formula::=constant '(' open_term sequence ')';
formula sequence::=formula| formula ',' formula sequence;
sentence::=constant '(' term_sequence ')' '.';
horn_clause::=formula 'IF': | formula 'IF' formula sequence '.';

The language defined above starts from the individual letters and builds the larger terms of the language. "Constants" are the individual words of the language. "Functional terms" are a type of term that is constructed out of multiple constants but, like constants, can be used as names. The first constant in the functional term is called the "functor." The remaining constants are the "arguments" of the functional term. For example, constants may include 'UnitedStates' and 'CapitalOf'. In this example, 'CapitalOf' would be a functor and 'UnitedStates' could be used as an argument with that functor. A functional term may be created using the above syntax comprising: '[CapitalOf UnitedStates]'. That functional term would denote the capital of the United States: Washington, DC.

In this language, the "sentence" and "Horn clause" constructs are the heart of the language. Sentences are used to store data, with various types of names used to denote objects and their attributes. The sentences may not involve logical connectors. Thus, sentences alone may not support deductions. The inclusion of Horn clauses may enable deduction. This is based on two important features associated with Horn clauses: the use of the keyword "IF" and the usage of "formulas" in the definition.

In the definition of the language, Horn clauses are constructed around the keyword "IF". There are two parts to a Horn clause: the head and the body. The head is the formula to the left of the "IF" keyword. The body is the, potentially empty, list of sentences to the right of the "IF" keyword.

Formulas are sentence-like structures that contain variables. The use of variables illustrates a common feature of predicate logic called "quantification." Quantification enables predicate logic to include statements that do not include specific names, but which instead express a generalization. The most common forms of quantification are "universal" and "existential." They function like the English words "everything" and "something," respectively. The example language should be interpreted as having universal quantification for all variables. That is, each variable should be read as "every _____."

Deduction may be enabled within the example language by associating it with deduction patterns: "instantiation" and "unification." Instantiation is the process by which all instances of a variable within a Horn clause are replaced with a name and a new Horn clause is created. Unification enables the deduction of the head sentence as a new sentence when all the sentences of the body are known (e.g., stated or deducible). The table below specifies a simple deduction which the example language supports.

| | |
|---|---|
| Mortal (?X) IF Human (?X). | Sentence 1 (All humans are mortal.) |
| Human (Socrates). | Sentence 2 (Socrates is human.) |
| Mortal (Socrates) | Sentence 3, Deduced from 1 by IF Human (Socrates). Instantiation |
| Mortal (Socrates) | Sentence 4, Deduced from 2 and 3 by Unification. |

The foregoing example is a rendering of the classic syllogism "All men are mortal. Socrates is a man. Therefore, Socrates is mortal."

The example language described herein approximates the language PROLOG, but is ultimately a form of predicate logic. Predicate logic include additional connectives (syntactic elements that represent negations, conjunctions, disjunctions, or conditionals) and, as mentioned, usually supports both existential and universal quantification. As described herein, the sentences in the logic that support deductions via some combination of connectives and quantification in association with deduction patterns may be referred to as "rule sentences."

The language utilized by system 100 described herein may include one or more extensions to conventional predicate logic. For example, the language utilized by system 100 may further include dedicated classes of expressions for numbers, strings, and/or other potential data types within the language, and/or may further include a query language. Conventionally, PROLOG and other languages have been paired with query languages that work with data stored in some form of predicate logic. Conventional query languages follow a common pattern and use formulas (i.e., sentence like structures which include variables, like the formulas in our example language). However, the variables here are not quantified. Instead, in the parlance of predicate logic, they are "free." This relates to an important difference between predicate logic used for academic study and its technical applications, which introduce queries. A key feature of predicate logic is its semantics, which specify how to determine if a sentence is true or false. Variables are associated with quantifiers so that they can be interpreted within the semantics. However, queries are not like statements.

Although they may return a value of true or false, they are not themselves true or false because they are not declarative sentences, they are of a different grammatical category.

Query languages work by matching formulas against sentences. The core to this process is that if the constants in the formula match against the corresponding constants at the same position in the sentence, then the variables in the formula will bind to the constants at the corresponding positions in the sentence. Results are created by the formula matching against all the stored sentences. PROLOG and technologies that support these query languages take advantage of deduction to make a powerful addition to query capabilities. Specifically, the queries will not match just against sentences that are explicitly stated, but also sentences that can be deduced. For example, if the query "Who is mortal?" could be expressed against the data and rule statements in the example provided in the table above, the query could take the form "Mortal(?Y)". This query could not be answered with just Sentence 1 and Sentence 2. However, because "Mortal(Socrates)" can be deduced from them, then it is possible to return a result where the variable "?Y" is bound to "Socrates." This process of answering queries by matching formulas against both explicitly stated sentences and deduced sentences may be referred to herein as "inference."

A more unusual, but not novel, extension to predicate logic in the example language utilized by system 100 described herein is the inclusion of "quotation." The Cyc project uses a form of quotation in its extended form of predicate logic which it uses (see Matuszek, C. et al., "An Introduction to the Syntax and Content of Cyc"). Basically, "quotation" is a feature of languages that allows them to reference expressions of the language as linguistic expressions, as opposed to their standard denotations. The following sentences illustrate the difference in meaning that comes from using quotation:

Dogs are animals.
"Dogs" is a plural noun.
Dogs are nouns.

The first sentence is stating a fact about a type of living creature. The second sentence is talking about a word in the English language. The third sentence is false and sounds odd because it is attempting to talk about linguistic expressions (by referencing the linguistic category of nouns) without invoking quotation.

An aim of the technical solution provided by the systems and methods described herein is to use predicate logic to make statements about queries and rule statements. If the features of the queries and rules can be stated or just deduced, then questions can be answered about queries and rule statements. Following the conventions of predicate logic and how sentences and formulas are constructed, this would require that queries and rule statements become names. Quotation provides a mechanism to turn queries and rule statements into names, because the quoted form is a reference to the query or rule statement itself.

For quotation to be fully integrated, it must also play a role in deductions. Because quoted expressions act as names, deduction would most naturally be supported via an extension to how quantification works for the extended language. This would mean a set of variables, quantifiers, and deduction patterns for quotation. However, for quantification to work in conjunction with quotation, the common notion of quotation must be adapted. That is, if a variable appears in the context of a quote, is it quoted or is it being used as a variable? If a variable in a quote is being used as a variable, then the variable should be covered by instantiation (i.e., the deduction pattern introduced above for quantification). However, if the variable is being quoted, then the variable should not be able to be instantiated because it is not a normal variable—it is quoted. In order to distinguish these two cases, the extension to predicate logic would include two types of quotation, "bound quotes" and "open quotes," and a new class of variables—"quote variables."

"Quote variables" are a distinct class of variables that can only appear within the context of a quotation. Without this second class of variables, it would be unclear what variables within a quote are being quoted and which ones could be instantiated. Introducing the second class enables normal variables and quote variables to appear in the context of a quotation without it being unclear which ones could be instantiated (i.e., only the quote variables).

Bound quotes and open quotes are introduced to help clarify quantification deduction patterns. If the goal of introducing quotation is to allow us to speak about any expression in the language, then this would also apply to quotes and quote variables. A "bound quote" is a quote where none of the contained variables, neither normal nor quote variables, can be instantiated. An "open quote" is a quote where the quote variables but not the normal variables can be instantiated.

Accordingly as discussed herein, the language utilized by system 100 may comprise an extended form of predicate logic that includes one or more of the following features: (i) functional terms; (ii) a query language that follows the same basic structure for how data is stored but which uses variables to specify bindings within results (i.e., sentences and formulas); (iii) a syntax for quotation with two forms of quotation (i.e., open quotation and bound quotation) and/or a class of variables (i.e., "quote variables") with associated quantifiers; and (iv) deduction patterns for bound quotes, open quotes, and quote variables, including instantiation.

Example Flowchart of Processes

Figure 2:
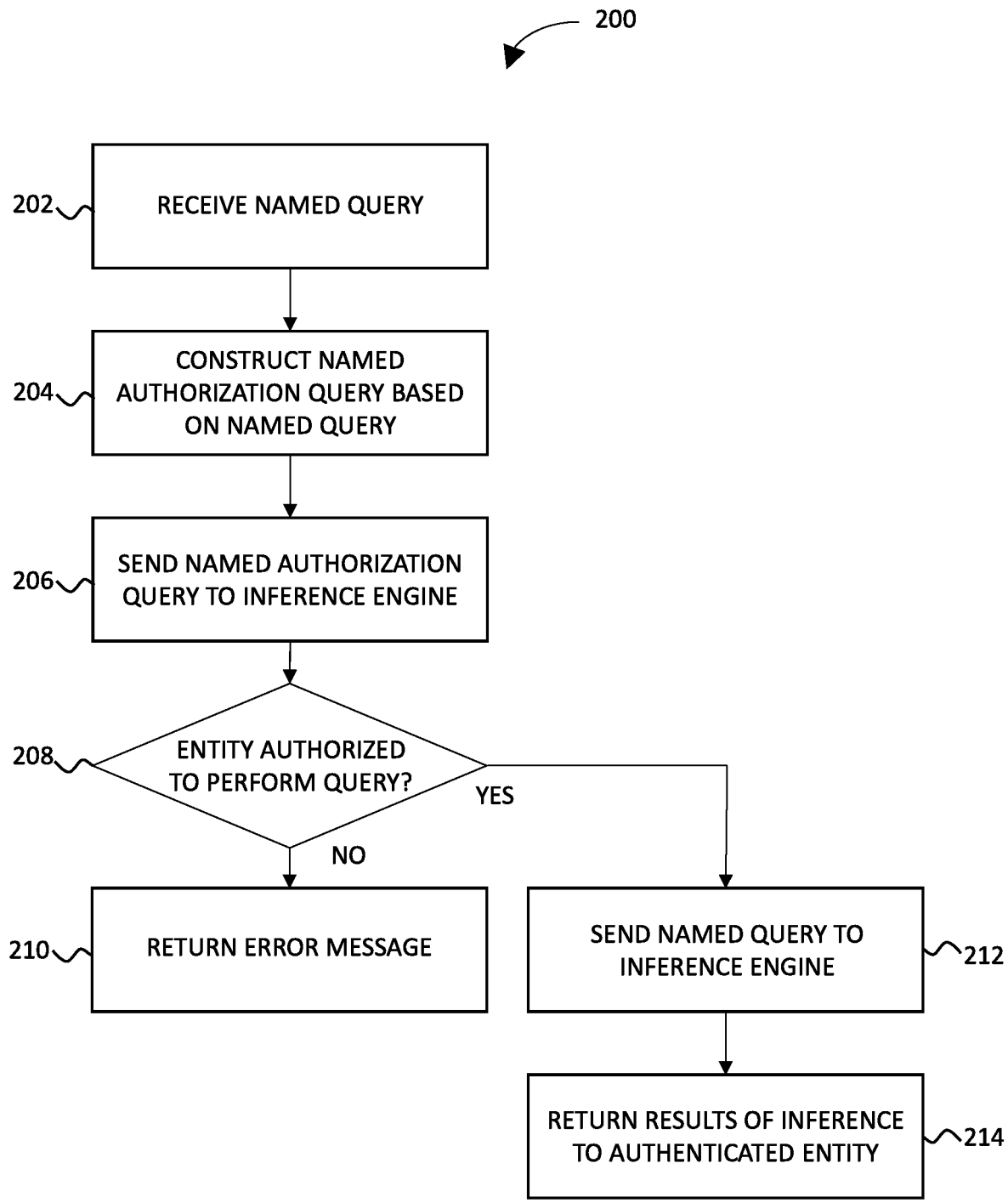
FIG. 2 illustrates an example of a process of receiving and processing queries, according to an implementation of the invention.

FIG. 2 illustrates an example of a process 200 of receiving and processing queries, according to an implementation of the invention. The operations of process 200 presented below are intended to be illustrative and, as such, should not be viewed as limiting. In some implementations, process 200 may be accomplished with one or more additional operations not described, and/or without one or more of the operations discussed. In some implementations, two or more of the operations may occur substantially simultaneously. The described operations may be accomplished using some or all of the system components described in detail above.

In some implementations, process 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of process 200 in response to instructions stored electronically on one or more electronic storage mediums. The one or more processing devices may include one or more devices configured through hardware, firmware, and/or software to be specifically designed for execution of one or more of the operations of process 200. In various implementations, the operations of process 200 may be performed by a query server (which may be the same as or similar to query component 118).

In an operation 202, process 200 may include receiving a named query. For example, a query server may receive a named query from an entity over a network connection. The entity could comprise one of a variety of sources. For example, the query server may receive a named query from an application server (or application component 124) based on interactions with an application browser, the query server may receive a named query from an induction server (or induction component 130) to collect data to support the rule generation process, and/or the query server may receive from service endpoint 132 a named query that service endpoint 132 had converted from another messaging protocol.

In an operation 204, process 200 may include constructing a named authorization query for the entity based on the named query received. The named authorization query may comprise a standard query which asks, "Is this entity authorized to ask this named query?" In an operation 206, process 200 may include sending the named authorization query to an inference engine. For example, the query server may send the named authorization query to an associated inference engine (i.e., inference engine 122). The associated inference engine may be a component of the query server or the inference engine could have a network connection to the query server and have authenticated the query server so that it is authorized to perform operations with the inference engine. In various implementations, the inference engine may be configured to execute its standard process described further herein with respect to FIG. 4, and then return the result(s) of the authorization query to the query server.

In an operation 208, process 200 may include responding to the authorization result(s). If the authorized query failed (i.e., the inference engine determines that the entity is not authorized to perform the query), process 200 may proceed to operation 210. If the authorization query succeeded, process 200 may proceed to operation 212. In operation 210, process 200 may include returning an error message indicated that the authorization query failed. For example, the query server may be configured to send, via a network connection, a message back to the entity that the authorization failed. In some implementations, operation 210 may end process 200 for the entity with respect to the named query.

In an operation 212, process 200 may include sending the named query to the inference engine. For example, the query server may send the named query received in operation 202 to inference engine 122. In various implementations, the inference engine may be configured to execute its standard process described further herein with respect to FIG. 4, and then return the result(s) of the named query to the query server. In an operation 214, process 200 may include returning the result(s) of the named query to the entity. For example, the query server may return the result(s) of the named query to the entity via a network connection.

Figure 3:
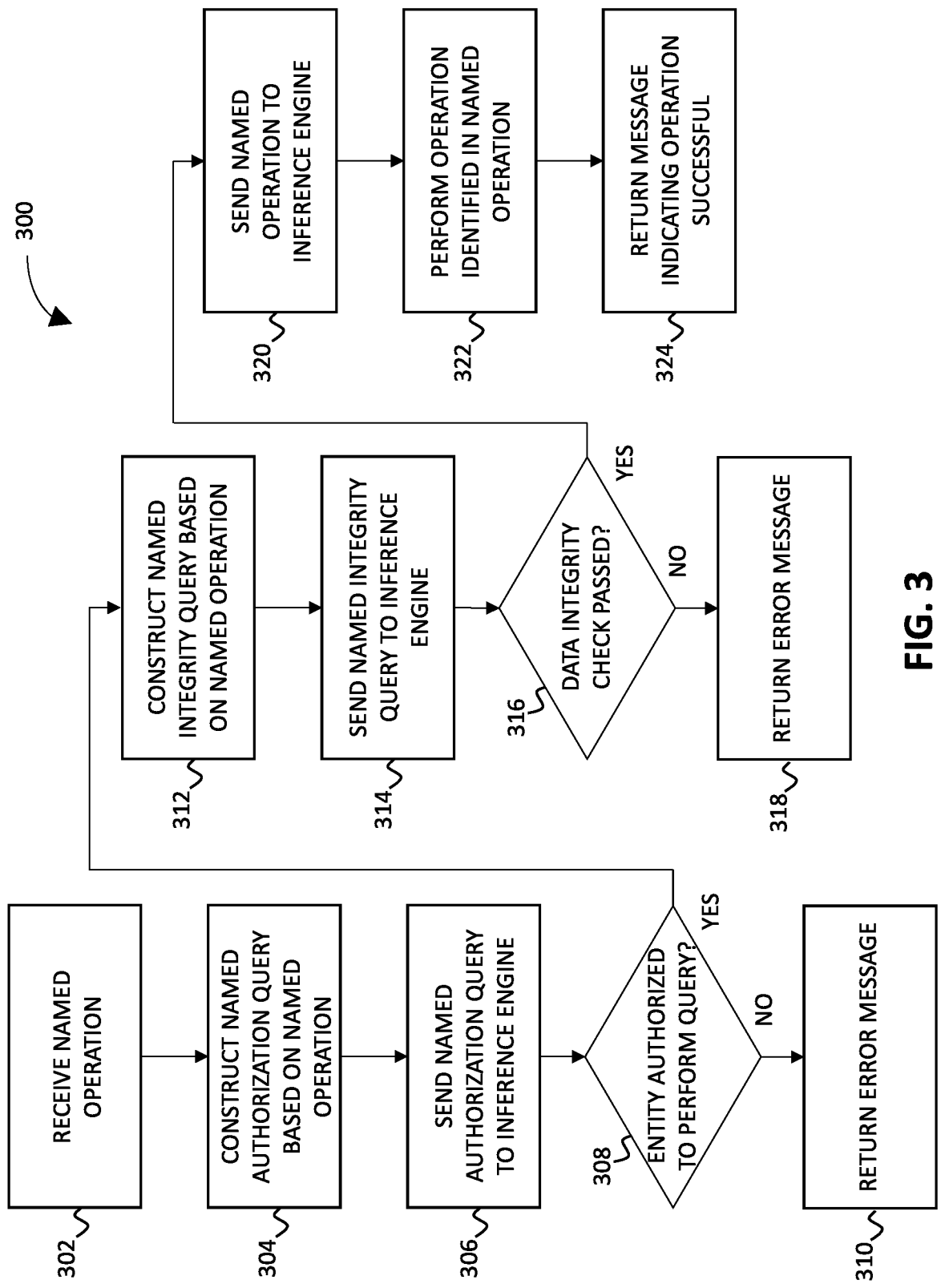
FIG. 3 illustrates an example of a process of receiving and processing operations, according to an implementation of the invention.

FIG. 3 illustrates an example of a process 300 of receiving and processing operations, according to an implementation of the invention. The operations of process 300 presented below are intended to be illustrative and, as such, should not be viewed as limiting. In some implementations, process 300 may be accomplished with one or more additional operations not described, and/or without one or more of the operations discussed. In some implementations, two or more of the operations may occur substantially simultaneously. The described operations may be accomplished using some or all of the system components described in detail above.

In some implementations, process 300 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of process 300 in response to instructions stored electronically on one or more electronic storage mediums. The one or more processing devices may include one or more devices configured through hardware, firmware, and/or software to be specifically designed for execution of one or more of the operations of process 300. In various implementations, the operations of process 300 may be performed by an operation server (which may be the same as or similar to operation component 120).

In an operation 302, process 300 may include receiving a named operation. For example, an operation server may receive a named operation from an entity over a network connection. The entity could comprise one of a variety of sources. For example, the operation server may receive a named operation from an application server (or application component 124) based on interactions with an application browser, the operation server may receive a named operation from an induction server (or induction component 130) to store the results of the induction process, and/or the operation server may receive from service endpoint 132 a named operation that service endpoint 132 had converted from another messaging protocol.

In an operation 304, process 300 may include constructing a named authorization query for the entity based on the named operation received. The named authorization query may comprise a standard query which asks, "Is this entity authorized to perform this named operation?" In an operation 306, process 300 may include sending the named authorization query to an inference engine. For example, the operation server may send the named authorization query to an associated inference engine (i.e., inference engine 122). The associated inference engine may be a component of the operation server or the inference engine could have a network connection to the operation server and have authenticated the operation server so that it is authorized to perform operations with the inference engine. In various implementations, the inference engine may be configured to execute its standard process described further herein with respect to FIG. 4, and then return the result(s) of the authorization query to the operation server.

In an operation 308, process 300 may include responding to the authorization result(s). If the authorized query failed (i.e., the inference engine determines that the entity is not authorized to perform the operation), process 300 may proceed to operation 310. If the authorization query succeeded, process 300 may proceed to operation 312. In operation 310, process 300 may include returning an error message indicating that the authorization query failed. For example, the operation server may be configured to send, via a network connection, a message back to the entity that the authorization failed. In some implementations, operation 310 may end process 300 for the entity with respect to the named operation.

In an operation 312, process 300 may include constructing a named data integrity query based on the named operation received. For example, the operation server may construct a named data integrity query from the named operation which was provided by the entity. The named data integrity query may comprise, for example, a standard query which asks, "Does this named operation satisfy or violate its associated data integrity rules?" In an operation 314, process 300 may include sending the named data integrity query to an associated inference engine. Based on the functor of the named operation, a set of rules specific to that operation may be assembled such that the inference is specific to that named operation. For example, the operation server may send the named data integrity query to inference engine 122. In various implementations, the inference engine may be configured to execute its standard process described further herein with respect to FIG. 4, and then return the result(s) of the named data integrity query to the operation server. In an operation 316, process 300 may include responding to the data integrity check result(s). If the data integrity query failed (i.e., the named operation violates one or more data integrity requirement(s)), process 300 may proceed to operation 318. If the data integrity query succeeded, process 300 may proceed to operation 320. In an operation 318, process 300 may include returning an error message indicating that the data integrity check failed. For example, the operation server may be configured to send, via a network connection, a message back to the entity that the data integrity check failed. In some implementations, operation 318 may end process 300 for the entity with respect to the named operation.

In an operation 320, process 300 may include sending the named operation to an associated inference engine. For example, the operation server may send the named operation (i.e., the named operation received in operation 302) to inference engine 122. In various implementations, the inference engine may be configured to execute its standard process described further herein with respect to FIG. 4, and then return the result(s) of the named operation to the operation server. The query results here will specify what statements should be added to, deleted from, or modified within specific collections of statements in data associated with the system (e.g., data stored by data component 116).

In an operation 322, process 300 may include performing the operations of the named operation received from the entity. For example, operation server may be configured to make modifications to data stored based on the named operation. In some implementations, the operation server may interface with the volume manager component 126, which is configured to identify the location of the data servers that store the data to be modified. In various implementations, the operation server may be configured to add the statements that should be added to the relevant collections of data, delete the statements that should be deleted, and modify the statements that should be modified. In an operation 324, process 300 may include returning a message that the operation succeeded to the entity. For example, the operation server may be configured to send, via a network connection, a message back to the entity that the modifications succeeded, potentially including references to the transactions that occurred in response to the named operation. In various implementations, operation 324 may end the process for the operation server with respect to the named operation.

Figure 4:
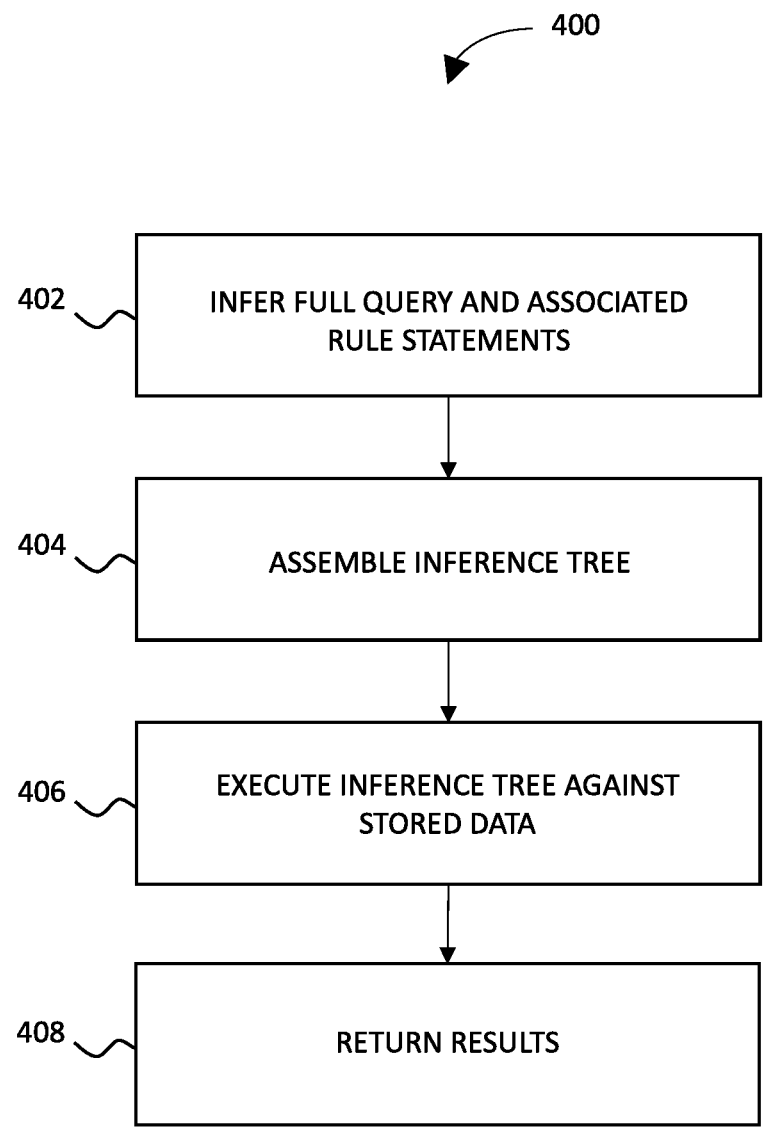
FIG. 4 illustrates an example of a process of utilizing inference trees to process named queries and operations, according to an implementation of the invention.

FIG. 4 illustrates an example of a process 400 of utilizing inference trees to process named queries and operations, according to an implementation of the invention. The operations of process 400 presented below are intended to be illustrative and, as such, should not be viewed as limiting. In some implementations, process 400 may be accomplished with one or more additional operations not described, and/or without one or more of the operations discussed. In some implementations, two or more of the operations may occur substantially simultaneously. The described operations may be accomplished using some or all of the system components described in detail above.

In some implementations, process 400 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of process 400 in response to instructions stored electronically on one or more electronic storage mediums. The one or more processing devices may include one or more devices configured through hardware, firmware, and/or software to be specifically designed for execution of one or more of the operations of process 400. In various implementations, the operations of process 400 may be performed by one or more processor components the same as or similar to inference engine 122 (shown in FIG. 1 and described herein).

In an operation 402, process 400 may include inferring full query and associated rule statements. In various implementations, inference engine 122 may be configured to obtain the named query or operation and performs two steps. First, inference engine 122 may be configured to run an inference to determine the corresponding full query for the named query or operation. Second, inference engine 122 may be configured to determine what rule statements, if any, should support the full query and how those rule statements may be fit together (i.e., how the consequents of one rule statement links the antecedent of another). This data could be gathered in multiple ways. For example, inference engine 122 may be configured to run a standard set of inferences against the data associated with the system (e.g., data stored by data component 116). In some implementations, inference engine 122 may be configured to interface with volume manager component 126 to identify the location of the data needed. In some implementations, inference engine 122 may be configured to obtain the data by pulling from an inference tree cache 134 previously constructed and serialized inference trees that allow inference engine 122 to skip the query step here and the assembling work of operation 404, and instead reconstruct the inference tree from its serialized form and proceed to operation 406.

In an operation 404, process 400 may include assembling an inference tree. In various implementations, operation 404 may begin with the query. Rule statements whose consequent formulas, which can be linked to formulas in the query, may be connected first. Rule statements may be recursively linked to other rule statements, where the formulas in the antecedents of earlier rule statements are linked to formulas in the consequents of later rules. As described herein, the result may comprise a tree-like structure of connected rule statements, which we will call an "inference tree." The set of rule statements that make up the inference tree may be limited to those returned from the query performed in operation 402. In some implementations, a shortened form of this step could be performed if there is a cache of previously constructed inference trees that could be adapted to the current named query or named operation.

In an operation 406, process 400 may include executing the inference tree against the stored data associated with the system. In various implementations, inference engine 122 may be configured to process the inference tree using the content stored by data component 116. The inference engine 122 may be configured to interface with and/or rely on volume manager component 126 to identify the location of the data needed. The process works from the rules that are at the "leaves" of the inference tree (i.e., their antecedents are not connected to any other rule statements). These rules (or rule statements) that are at the leaves of the inference tree may be referred to as "terminal rule statements." For the terminal rule statements, there are no deduced sentences which inference engine 122 can use. Inference engine 122 may only use statements that are stored within the data and then deduce new statements. After this point, there can be deduced statements and stored statements within the stored data. Both sets of statements are now used for subsequent deductions performed with non-terminal rule statements (i.e., intermediary rule statements). This process recurses through the tree structure until results are being fed into the formulas within queries at the base of the inference tree. When this process finishes, a set of results may be provided for the query. There is a third possible way that statements might become available for deduction. In some implementations, inference engine 122 may include modules that allow it to compute certain statements without the statements being deduced or stored by data component 116. For example, if a rule statement relies upon a mathematical calculation from data in other statements, that calculation may be expressed as a formula within a rule statement. Inference engine 122 may be configured to perform the calculation to determine the binding for the relevant variables, rather than having every possible mathematical calculation stored in the data or trying to deduce the calculation. In various implementations, inference engine 122 may include a wide range of modules for addressing these situations within its data.

In an operation 408, process 400 may include returning the result(s) generated from executing the inference tree against the stored data associated with the system. For example, inference engine 122 may be configured to return the result(s) to the entity that provided the named query or named operation via query component 118 or operation component 120.

Figure 5:
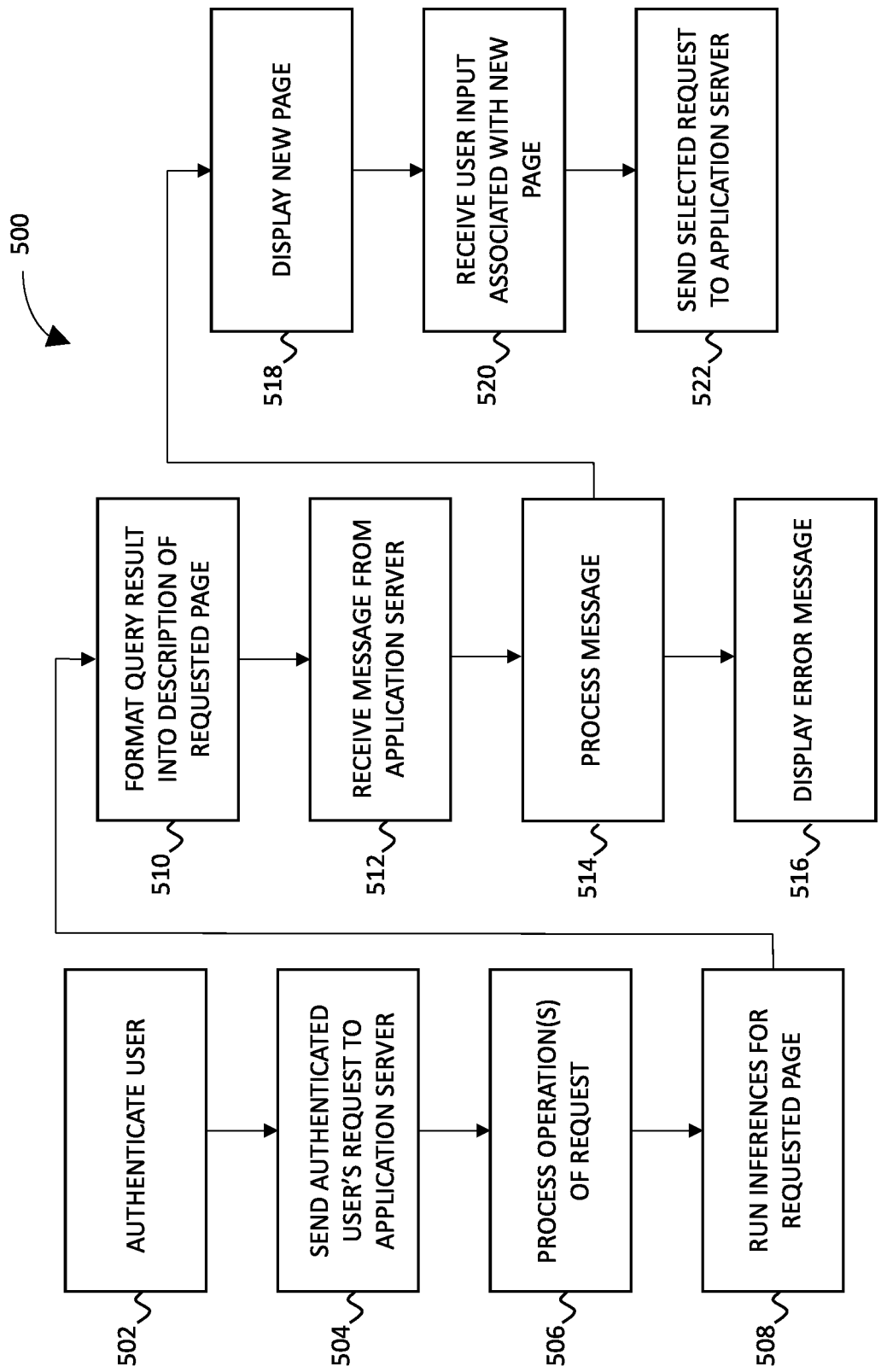
FIG. 5 illustrates an example of a process of executing an application that has been described in data using the extended form of predicate logic language described herein and using the inference engine to process both queries and operations required to process user inputs and instantiate a page of the application, according to an implementation of the invention.

FIG. 5 illustrates an example of a process 500 of executing an application that has been described in data using the extended form of predicate logic language described herein and using the inference engine to process both queries and operations required to process user inputs and instantiate a page of the application, according to an implementation of the invention. The operations of process 500 presented below are intended to be illustrative and, as such, should not be viewed as limiting. In some implementations, process 500 may be accomplished with one or more additional operations not described, and/or without one or more of the operations discussed. In some implementations, two or more of the operations may occur substantially simultaneously. The described operations may be accomplished using some or all of the system components described in detail above.

In some implementations, process 500 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of process 500 in response to instructions stored electronically on one or more electronic storage mediums. The one or more processing devices may include one or more devices configured through hardware, firmware, and/or software to be specifically designed for execution of one or more of the operations of process 500. In various implementations, the operations of process 500 may be performed by an application server and/or an application browser. As described herein, the application component 124 may include an application server and/or an application browser. Accordingly, the operations of process 500 may be performed by one or more processor components the same as or similar to application component 124 (shown in FIG. 1 and described herein).

In an operation 502, process 500 may include authenticating a user. For example, a user may attempt to log into an application browser. The application browser may be configured to authenticate the user based on a username and password and/or other security credentials. In various implementations, the user may be authenticated by an associated authentication service.

In an operation 504, process 500 may include sending a default request of the user to an application server. For example, the application browser may be configured to send the default request of the user to the application server in response to the user being authenticated. In various implementations, the application browser may be configured to store a default request of a user. A common example may be a home page which displays a list of applications to which the user has access. Alternatively, it could be configured to be a specific page which the user had saved during a previous session. In various implementations, the default request may be composed of at least two elements: an ordered list of zero or more named operations and zero-or-one named pages. Analogous to named queries and named operations, a "named page" may comprise a functional term which is used to construct an inference. In various implementations, named pages may be used to run inferences to determine a collection of content which the application browser will render (e.g., via a client computing platform 104). In various implementations, the application browser may be analogous to a web browser, and a named page may be analogous to a web page. A key distinction may be that the named page is not identifying a location on a network (e.g., a Uniform Resource Locator). Instead, a named page identifies a collection of information and interactions which can be displayed via the application browser (e.g., on client computing platform 104).

In an operation 506, process 500 may include processing operations associated with the request. For example, the application server may receive the request and first process the named operations in order. The application server may comprise an authenticated entity related to an operation server (or operation component 120) described here. The application server may be configured to send each named operation to the operations server on behalf of the authenticated user (who will be the subject of the authorization check). The operation server may be configured process each named operation as described with respect to process 300 depicted in FIG. 3. In cases where authorization or data integrity checks fail, the application server may be configured to store the message from the operation server for inclusion in the return message to the application browser. If the request included a named page, the application server may proceed to operation 508. Otherwise, process 500 may proceed to operation 512.

In an operation 508, process 500 may include running inferences for the requested page. For example, the application server may be configured to utilize the query server (or query component 118) to run inferences for the requested page. If the request does contain a named page, the application server may be configured to construct named queries which will be used to determine the elements of the page, their content, layout, and formatting. In some implementations, there is not fixed set of elements which can appear in a page. For example, the types of elements may range from simple texts and images, interactive buttons that enable them to navigate to new pages, common controls (e.g., lists drop down menus, tables, etc.) and specialized interactive visualizations (e.g., data visualizations or augmented reality applications). In various implementations, the named queries are designed to infer the individual elements which should appear in the page and each element's details. The rules that are associated with the named page and which get assembled into the inference tree will have been designed to supply all needed details for each element. Because different types of elements can be described with different vocabulary, multiple named queries may need to be run in order to gather results for all the elements within the page. In various implementations, the application server may be configured to run all the named queries via the query server. In various implementations, the content of the element depends on the type of element. For simple labels, it may be just the text that it displays. For images, it may be an identifier of the image file to display. For navigation buttons, it may be the named page that the browser would display next. For buttons where the user is inputting new data, the content may be details on how to create a named operation based on the user's input. For example, an interactive element where a user can enter text could be used for different named operations on different pages. On one page, users could use it to enter their name. On others, users could use the same interactive element to enter task descriptions into a to-do list. The different semantics of the element on different pages is determined by the different named operation with which they are associated on those different pages. In various implementations, the application server may be configured to send the named queries to the query server on behalf of the authenticated user (who will be the subject of the authorization check). For each query, the query server may be configured to go through operations 202-214 of process 200. If the authorization check fails, the application server may be configured to store that message from the query server for inclusion in the return message to the application browser. Otherwise, the query server may be configured to complete the process and returns the query results to the application server.

In an operation 510, process 500 may include formatting the query result(s) into a description of the requested page. For example, the application server may be configured to format the query result(s) into a description of the requested page. If the request included a named page and authorization was successful, the application server may be configured to receive query results in the standard format via which the query server returns all results. In various implementations, the application server may be configured to process the result(s) to compile the result(s) into a standard format that the application browser is configured to interpret and then render to the screen.

In an operation 512, process 500 may include receiving a message from the application server. For example, the application server may be configured to combine any message from named operations and the formatted query result (s) for the named page's content into a single message. The application server may be configured to return the message to the application browser over a network connection.

In an operation 514, process 500 may include processing the message. For example, the application browser may be configured to process the message received back from the application server. In various implementations, the application browser process may branch based on the content of the message received back from the application server. If there were any failures with processing operations or inferences for a named page (e.g., failed authorizations), the application browser may proceed to operation 516. If the request included a new named page that was successfully processed, the application browser may proceed to operation 518.

In an operation 516, process 500 may include displaying an error message. For example, the application browser may be configured to display a message describing the nature of the error which occurred and, if appropriate, interactive controls with actions that the user can take. Depending on the nature of the error, the application browser may be configured to proceed to operation 518. For example, application browser may be configured to display the last page it rendered.

In an operation 518, process 500 may include displaying a new page. For example, the application browser may be configured to extract each of the elements from the page description. In various implementations, application browser may be configured to instantiate appropriate software modules for each type of element. The instantiated modules may be configured to process the content and styling that have been linked to that element. In various implementations, the application browser may be configured to render all the associated modules to the display.

In an operation 520, process 500 may include receiving user input associated with the new page. For example, the user may interact with the page displayed in the application browser to navigate to a page and/or update data. In various implementations, the elements of the page may support different types of interaction (i.e., data update operations versus navigations to new pages). Based on the user's goals, the user may interact with the elements displayed in the page. The instantiated modules may be configured to interpret the user's input. If the input requires interaction with the application server to update or query new data, the modules may be configured to notify the application browser of the request to send to the application server.

In an operation 522, process 500 may include sending the selected request to the application server. For example, the application browser may be configured to send the selected request to the application server. In various implementations, the application browser may be configured to obtain the request from the activated page element module and forward the request to the application server. Responsive to the request being forwarded to the application server, process 500 may return to operation 506 and proceed accordingly.

The various processing operations and/or data flows depicted in FIGS. 2-5 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

System Advantages

The systems and methods described herein address the technical problem(s) caused by the disconnect between languages for data, queries, and programming, which, for example, may result in various additional costs risks for organizations. The systems and methods described herein address the technical problem(s) described herein with an extended form of predicate logic to store data, queries, and operations in a common way and a technical implementation that allows users to manage and run queries on the data, queries, and operations. However, the technical solution embodied by these systems and methods also enables a broader set of benefits.

For example, organizations are composed of business systems which are further composed of people, processes, and technology to achieve some goal (e.g., profit making, public services, etc.). Organizations invest in these business systems and need a return on investment or other benefit from those investments. Technology investments include wide ranges of equipment. For information technology, this may typically include hardware and software. However, technology can require its own business systems, each devoted not to the broader organization's mission but to the management of information technology used within the organizations main business systems. These IT-focused business systems involve dedicated people, processes, and additional technology.

For example, IT development and operations are IT-focused business systems for creating, deploying, and maintaining new features and functionality. These IT-focused business systems have processes staffed by several roles (e.g., managers, engineers, designers, and testers) as well as technology these roles needs to complete their work. When organizations have large enough information technology investments, additional IT-focused systems typically include data management, IT architecture, and IT portfolio management. As business systems, each may have dedicated people, processes, and technology. When an organization has a large enough IT portfolio, these IT-focused business systems are typically managed by a chief information officer (CIO). The CIO would be responsible for delivering these IT capabilities but also for delivering a return on investment.

The growth of IT-focused business systems creates a challenge for CIOs to deliver returns on investments. In short, IT-focused business systems are often overhead, because they are not geared towards achieving the organizations' core mission. The technology which the core business systems use directly supports the organizations missions. IT-focused business systems are focused on the organizations' technology footprint. This indirect connection to organizations' missions makes it difficult for these IT-focused systems to deliver a positive return on investment.

The best strategy for maximizing the return on investment for these IT-focused business systems is to minimize their costs, as that lowers the required level of benefits needed for a positive return. Alternatively, the strategy minimizes the negative impact when there are no quantifiable benefits. In general, organizations whose core mission is not the delivery of information technology (i.e., businesses that do not sell software) should be trying to minimize the size and scope of these IT-focused business systems. Since most organizations are not dedicated to delivering information technology, this applies to most organizations.

The technology embodied in the systems and methods described herein represents a novel solution which CIOs or other managers of organizations' information technology footprints can adopt to maximize the return on their investment in business systems. The focus would be on minimizing the cost, but it would do so by radically shifting the mixture of people, processes, and technology that go into business systems (whether core or IT-centric).

The main beneficiaries may be organizations that have a large IT footprint, and which require various IT-focused business systems. Right now, IT-focused business systems require specialized skills and expertise such that specific technical personnel must be hired for an organization to acquire those skills. This means that the IT-focused business systems depend on expensive and dedicated resources (i.e., resources whose skills cannot be applied within other business systems).

The technology embodied in the systems and methods described herein may require a different and much smaller set of skills. For example, the foundational skill may comprise an understanding of predicate logic—a skill which may be gained in a one semester introductory college class. Skills whose foundations are based on a single class are much different than skills for which there is an entire major. By lowering the skill requirements to use this solution, organizations have a new option for how to create business systems. By replacing standard technologies of today with the new technology described herein, organizations would be able to change the range of persons who could complete the system. That is, there are different combinations of people and processes that could be matched with this technology, creating options for new business system configurations. For example, existing personnel with specific skills (e.g., accounting) could be trained up on predicate logic and the usage of this technology. Alternatively, people who specialize in this technology could be used across business systems because understanding different applications that might be built on this technology only depends on understanding the statements, queries, and rules involved. They no longer need to contend with diverse languages, frameworks or engineering styles that are part of utilizing current technologies.

Example Implementation—Compliance

A concrete example of the utility of the systems and methods described herein is the potential to transform compliance processes around such topics as privacy data, such as personally identifiable information (PII) or personal health information (PHI). Because of the utilization of predicate logic, this topic may begin with understanding which predicates represent relevant forms of privacy data. For example, a predicate might link a person to their Social Security Number. Thus, sentences using that predicate would constitute PII. Another predicate might link a person to a medical event. Thus, sentences using that predicate would constitute PHI. This new information (i.e., what predicates constitute PII or PHI) could also be added as descriptions of the predicates themselves. This would then allow for the construction of queries to identify all of the predicates that are related to PII or PHI. The ability to query for predicates that constitute PII or PHI may enable the creation of queries about the data, queries, inferences, and operations involved in an application that involve privacy data. For example, an evaluator could run queries to identify what queries utilize PII predicates or which operations add or modify statements using PHI predicates. Because these are the queries and operations which constitute applications built on this technology, the evaluator would have an accurate method for investigating activities around privacy data that may be fully automated.

Example Implementation—Enterprise Architecture

Another concrete example of the utility of the systems and methods described herein is the potential to transform Chief Information Officer organizations. A specific function within CIO organizations is enterprise architecture. A key task of enterprise architects is to document the range of IT applications and systems within the organization and how they support business functions. For example, it could track the various financial applications and financial functions they support (i.e., accounting, budgeting, expense tracking, etc.). The enterprise architecture(s) enable the CIO to track the status of new and ongoing IT investments.

Enterprise architects must provide a detailed and accurate description of the IT footprint. This includes not just the systems, but the data they contain, the services they provide to different organizational functions, and their connections to other systems. Enterprise architects use dedicated tools, create unique data, and have their own specific processes. They are a prime example of an IT-focused business system: a system that exists to support an organization's IT footprint as opposed to the organization's core mission. Enterprise architecture can be difficult to create because the architects need to translate available documentation about the IT systems into enterprise architecture, but only if that documentation is available. As mentioned before, this documentation often does not exist, or it might be out of date if it has not been consistently updated to track changes in IT systems. If the enterprise architecture is inaccurate or incomplete it loses significant value, thereby reducing the return on investment in an enterprise architecture program.

The systems and methods described herein may radically change the need for, and role of, enterprise architecture. In particular, the components of the technology described herein may be commoditized and generic. For example, they may not be unique IT systems. Based on the size of an organization and the scale of its data, organizations may install more components to scale, with all the components being the same. Further, applications and systems built using the technology described herein would be stored as data in predicate logic. Storing them as data eliminates the need to translate IT documentation into enterprise architecture. The data which the enterprise architects are seeking is the same data that composes the applications built in the extended form of predicate logic. The enterprise architects can run queries to get complete and accurate descriptions of the data, queries, inferences, and operations which compose those applications. Further, as needed, the enterprise architects can supplement the data that describes the application(s) with additional data to connect those applications to business functions and other elements of the enterprise. This feature of the invention eliminates the need for enterprise architects to have distinct tools and data that they need to update constantly to accurately reflect changes in the IT footprint. This greatly increases the productivity of enterprise architects. Thus, the cost of an enterprise architecture program would be reduced because work and dedicated technologies may be eliminated, while enterprise architects' effectiveness is increased.

Enterprise architecture and compliance are just two examples. There are a range of potential benefits from this technology by enabling organizations to change how they construct business systems. The simplicity of the technology allows organizations to gain various forms of cost savings and to improve the effectiveness and efficiency of their business systems—most notably their IT-focused business systems.

For purposes of explanation, numerous specific details are set forth in order to provide a thorough understanding of the description. It will be appreciated by those having skill in the art that the implementations described herein may be practiced without these specific details or with an equivalent arrangement. Accordingly, it is to be understood that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

The various instructions described herein are exemplary only. Other configurations and numbers of instructions may be used, so long as the processor(s) are programmed to perform the functions described herein. The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 112 may be programmed by one or more additional instructions that may perform some or all of the functionality attributed herein to one of the computer-readable instructions.

Although processor(s) 112 are illustrated in FIG. 1 as a single component, this is for illustrative purposes only. In some implementations, processor(s) 112 may comprise multiple processing units. These processing units may be physically located within the same device, or processor(s) 112 may represent processing functionality of multiple devices operating in coordination. In some implementations, one or more processors 112 may be implemented by a cloud of computing platforms operating together as one or more processors 112. Processor(s) 112 be configured to execute one or more components by software; hardware; firmware; some combination of software, hardware, and/or firmware; and/or other mechanisms for configuring processing capabilities on processor(s) 112.

As used herein, the term "component" may refer to any component or set of components that perform the functionality attributed to the component. This may include one or more servers or physical processors during execution of computer-readable instructions, the computer-readable instructions, circuitry, hardware, storage media, or any other components. Furthermore, it should be appreciated that although the various instructions are illustrated in FIG. 1 as being co-located within a single processing unit, in implementations in which processor(s) 112 include multiple processing units, one or more instructions may be executed remotely from the other instructions.

The various instructions described herein may be stored in a storage device, which may comprise random access memory (RAM), read only memory (ROM), and/or other memory. For example, electronic storage 140 may comprise any tangible computer readable storage medium, including random access memory, read only memory, magnetic disk storage media, optical storage media, flash memory devices, and/or other memory configured to computer-program instructions. In various implementations, electronic storage 140 may be configured to store the computer program instructions (e.g., the aforementioned instructions) to be executed by the processors as well as data that may be manipulated by the processors.

One or more databases may be stored in one or more storage devices of system 100 (e.g., electronic storage 140). For example, one or more collections of statements of predicate logic may be stored in the one or more databases, as described herein. The databases described herein may be, include, or interface to, for example, graph databases, NoSQL databases, Oracle™ relational databases sold commercially by Oracle Corporation, Informix™, DB2 (Database 2), or other data storage, including file-based, or query formats, platforms, or resources such as OLAP (On Line Analytical Processing), SQL (Structured Query Language), a SAN (storage area network), Microsoft Access™, and/or other. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™, and/or other types of databases now known or future developed. The database may comprise one or more such databases that reside in one or more physical devices and in one or more physical locations. The database may store a plurality of types of data and/or files and associated data or file descriptions, administrative information, or any other data.

The various components illustrated in FIG. 1 may be coupled to at least one other component via a network 102, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing Figures, different numbers of entities than those depicted may be used. Furthermore, according to various implementations, the components described herein may be implemented in hardware and/or software that configure hardware.

In some instances, well-known structures and devices are shown in block diagram form in order to avoid unnecessarily obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one implementation", "an implementation", "some implementations", "various implementations", "certain implementations", "other implementations", "one series of implementations", or the like means that a particular feature, design, structure, or characteristic described in connection with the implementation is included in at least one implementation of the disclosure. The appearances of, for example, the phrase "in one implementation" or "in an implementation" in various places in the specification are not necessarily all referring to the same implementation, nor are separate or alternative implementations mutually exclusive of other implementations. Moreover, whether or not there is express reference to an "implementation" or the like, various features are described, which may be variously combined and included in some implementations, but also variously omitted in other implementations. Similarly, various features are described that may be preferences or requirements for some implementations, but not other implementations.

The language used herein has been principally selected for readability and instructional purposes, and it may not have been selected to delineate or circumscribe the inventive subject matter. Other implementations, uses, and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system configured to utilize a single sequence of operations for querying data and processing operations on the data, the system comprising:
   a memory configured to store data associated with the system, wherein the data is stored in a form of predicate logic extended to include quotation; and
   one or more physical processors programmed by one or more computer program instructions that, when executed, configure the one or more physical processors to:
   receive input from an entity including a named query or a named operation;
   construct a named authorization query for the entity based on the input received;
   assemble a first inference tree comprising rule statements recursively linked to the named authorization query;
   recursively apply the rule statements of the first inference tree to the stored data;
   determine whether the entity is authorized to ask the named query or perform the named operation based on the application of the rule statements of the first inference tree to the stored data;
   determine a corresponding full query for the named query or named operation;
   identify a first set of rule statements including consequent formulas linked to a formula in the full query;
   identify a second set of rule statements including consequent formulas linked to antecedent formulas in the first set of rule statements;
   assemble a second inference tree comprising rule statements recursively linked to the full query, wherein the rule statements of the second inference tree include at least the first set of rule statements and the second set of rule statements;
   recursively apply the rule statements of the second inference tree to the stored data; and
   generate results of the full query based on the application of the rule statements of the second inference tree to the stored data.

2. The system of claim 1, wherein to apply the rule statements of the second inference tree to the stored data, the one or more physical processors are configured to:

bind formulas in terminal rule statements of the second inference tree to the stored data, wherein a first set of deduced results is generated based on the terminal rule statements; and bind formulas in at least a first set of intermediary rule statements of the second inference tree to the stored data and the first set of deduced results, wherein a second set of deduced results is generated based on the first set of intermediary rule statements; and bind formulas in at least a second set of intermediary rule statements of the second inference tree to the stored data and the second set of deduced results, wherein the results of the full query are generated when formulas in the full query are applied to stored data and deduced results previously generated based on intermediary rule statements.

3. The system of claim 1, wherein the input comprises a named query and the results of the full query comprise results of the named query, wherein the one or more physical processors are further configured to return the results of the named query to the entity.

4. The system of claim 1, wherein the input comprises a named operation and the results of the full query comprise identified statements to be modified by the named operation, wherein the one or more physical processors are further configured to:

perform one or more operations of the named operation on the identified statements, the one or more operations comprising adding, removing, or modifying the identified statements based on the named operation; and return a message to the entity comprising an indication that the named operation has been completed.

5. The system of claim 1, wherein the input comprises a named operation, and wherein responsive to a determination that the entity is authorized to perform the named operation, the one or more physical processors are further configured to:

construct a named data integrity query based on the named operation;

assemble a third inference tree comprising rule statements recursively linked to the named data integrity query;

recursively apply the rule statements of the third inference tree to the stored data; and determine whether the named operation satisfies data integrity rules associated with the named operation based on the application of the rule statements of the third inference tree to the stored data.

6. The system of claim 1, wherein the entity comprises a user and the input comprises a default request sent to an application server in response to the user attempting to log into an application via an application browser, the default request including at least one named query and the generated results comprising results of the at least one named query, wherein the one or more physical processors are further configured to:

format the results of the at least one named query into a format the application browser is configured to interpret;

provide the formatted results to the application browser; and render a page of the application browser in a display based on the formatted results.

7. The system of claim 6, wherein the one or more physical processors are further configured to:

receive a user request associated with the new page;

assemble a fourth inference tree comprising rule statements recursively linked to a named query associated with the user request;

recursively apply the rule statements of the fourth inference tree to the stored data;

generate results of the named query based on the application of the rule statements of the fourth inference tree to the stored data; and cause an updated page of the application browser to be rendered in the display based on the results of the named query.

8. The system of claim 1, wherein the input is received from the entity via another system using an alternative messaging protocol, wherein the one or more physical processors are further configured to:

translate the received input into the named query or the named operation.

9. The system of claim 1, wherein the one or more physical processors are further configured to:

retrieve a serialized inference tree from a cache configured to store inference trees created based on named queries or named operations, wherein the second inference tree comprising rule statements recursively linked to the full query is assembled based on the serialized inference tree retrieved from the cache.

10. A method for utilizing a single sequence of operations for querying data and processing operations on the data, the method being implemented on a computer system having one or more physical processors and a memory configured to store data associated with the system in a form of predicate logic extended to include quotation, the method comprising:

receiving input from an entity including a named query or a named operation;

constructing a named authorization query for the entity based on the input received;

assembling a first inference tree comprising rule statements recursively linked to the named authorization query;

recursively applying the rule statements of the first inference tree to the stored data;

determining whether the entity is authorized to ask the named query or perform the named operation based on the application of the rule statements of the first inference tree to the stored data;

determining a corresponding full query for the named query or named operation;

identifying a first set of rule statements including consequent formulas linked to a formula in the full query;

identifying a second set of rule statements including consequent formulas linked to antecedent formulas in the first set of rule statements;

assembling a second inference tree comprising rule statements recursively linked to the full query, wherein the rule statements of the second inference tree include at least the first set of rule statements and the second set of rule statements;

recursively applying the rule statements of the second inference tree to the stored data; and generating results of the full query based on the application of the rule statements of the second inference tree to the stored data.

11. The method of claim 10, wherein applying the rule statements of the second inference tree to the stored data comprises:

binding formulas in terminal rule statements of the second inference tree to the stored data, wherein a first set of deduced results is generated based on the terminal rule statements; and binding formulas in at least a first set of intermediary rule statements of the second inference tree to the stored data and the first set of deduced results, wherein a second set of deduced results is generated based on the first set of intermediary rule statements; and binding formulas in at least a second set of intermediary rule statements of the second inference tree to the stored data and the second set of deduced results, wherein a third set of deduced results is generated based on the second set of intermediary rule statements wherein the results of the full query are generated when formulas in the full query are bound to the stored data and deduced results previously generated based on intermediary rule statements.

12. The method of claim 10, wherein the input comprises a named query and the results of the full query comprise results of the named query, the method further comprising returning the results of the named query to the entity.

13. The method of claim 10, wherein the input comprises a named operation and the results of the full query comprise identified statements to be modified by the named operation, the method further comprising:
performing one or more operations of the named operation on the identified statements, the one or more operations comprising adding, removing, or modifying the identified statements based on the named operation; and returning a message to the entity comprising an indication that the named operation has been completed.

14. The method of claim 10, wherein the input comprises a named operation, and wherein responsive to a determination that the entity is authorized to perform the named operation, the method further comprises:
constructing a named data integrity query based on the named operation;
assembling a third inference tree comprising rule statements recursively linked to the named data integrity query;
recursively applying the rule statements of the third inference tree to the stored data; and
determining whether the named operation satisfies data integrity rules associated with the named operation based on the application of the rule statements of the third inference tree to the stored data.

15. The method of claim 10, wherein the entity comprises a user and the input comprises a default request sent to an application server in response to the user attempting to log into an application via an application browser, the default request including at least one named query and the generated results comprising results of the at least one named query, wherein the method further comprises:
formatting the results of the at least one named query into a format the application browser is configured to interpret;
providing the formatted results to the application browser; and
rendering a page of the application browser in a display based on the formatted results.

16. The method of claim 15, the method further comprising:
receiving a user request associated with the new page;
assembling a fourth inference tree comprising rule statements recursively linked to a named query associated with the user request;
recursively applying the rule statements of the fourth inference tree to the stored data;
generating results of the named query based on the application of the rule statements of the fourth inference tree to the stored data; and
causing an updated page of the application browser to be rendered in the display based on the results of the named query.

17. The method of claim 10, wherein the input is received from the entity via another system using an alternative messaging protocol, the method comprising:
translating the received input into the named query or the named operation.

18. The method of claim 10, the method further comprising:
retrieving a serialized inference tree from a cache configured to store inference trees created based on named queries or named operations, wherein the second inference tree comprising rule statements recursively linked to the full query is assembled based on the serialized inference tree retrieved from the cache.

\* \* \* \* \*